United States Patent
Ruff et al.

(10) Patent No.: US 8,136,752 B2
(45) Date of Patent: Mar. 20, 2012

(54) PAWL ASSEMBLY

(75) Inventors: Stephen A. Ruff, Chesham (GB); Navdeep S. Riarh, London (GB)

(73) Assignee: Martin-Baker Aircraft Co. Ltd. (GB)

( * ) Notice: Subject to any disclaimer, the term of this patent is extended or adjusted under 35 U.S.C. 154(b) by 367 days.

(21) Appl. No.: 12/543,029

(22) Filed: Aug. 18, 2009

(65) Prior Publication Data

US 2011/0031342 A1    Feb. 10, 2011

(30) Foreign Application Priority Data

Aug. 6, 2009 (GB) .................................. 0913723.3

(51) Int. Cl.
B60R 22/40 (2006.01)
(52) U.S. Cl. .................................. 242/384.2; 242/384.3
(58) Field of Classification Search ................... 242/384, 242/384.1–384.3, 396.4
See application file for complete search history.

(56) References Cited

U.S. PATENT DOCUMENTS

| | | |
|---|---|---|
| 3,108,456 A | 10/1963 | Wittingham |
| 3,667,698 A | 6/1972 | Fisher |
| 3,711,037 A | 1/1973 | Jakob |
| 3,838,832 A | 10/1974 | Romanzi |
| 3,917,188 A | 11/1975 | Nilsson |
| 4,085,905 A | 4/1978 | Lindbald |
| 4,108,394 A | 8/1978 | Oishsi |
| 4,135,683 A | 1/1979 | Stephenson |
| 4,241,887 A | 12/1980 | Augunas |
| 4,244,537 A | 1/1981 | Labeur |
| 4,452,405 A | 6/1984 | Adomeit |
| 4,467,981 A | 8/1984 | Mori |
| 4,522,350 A | 6/1985 | Ernst |
| 4,607,805 A * | 8/1986 | Burghardt et al. ......... 242/383.1 |
| 4,905,928 A | 3/1990 | Kasuno |
| 5,351,908 A | 10/1994 | Umezawa |
| 5,568,941 A | 10/1996 | Woydick |
| 5,636,807 A | 6/1997 | Warrick |
| 5,660,444 A | 8/1997 | Thomas |
| 6,202,952 B1 | 3/2001 | Kopetzky |
| 6,267,315 B1 * | 7/2001 | Blackadder et al. .......... 242/384 |
| 6,732,969 B2 * | 5/2004 | Tanji et al. ................. 242/384.1 |
| 7,731,118 B2 * | 6/2010 | Ruff et al. .................. 242/382.2 |
| 2001/0028167 A1 | 10/2001 | Kielwein |
| 2003/0209074 A1 | 11/2003 | Ruff |
| 2006/0144984 A1 | 7/2006 | Daeuber |
| 2007/0228203 A1 * | 10/2007 | Ruff et al. .................. 242/383.2 |
| 2009/0057466 A1 | 3/2009 | Choi et al. |

FOREIGN PATENT DOCUMENTS

EP    1102070    7/1999

(Continued)

OTHER PUBLICATIONS

UK Patent Office; Combined Search and Examination Report concerning related GB App. GB0913723.3; Aug. 27, 2010; 6 pages.

(Continued)

Primary Examiner — Sang Kim
(74) Attorney, Agent, or Firm — Hancock Hughey LLP (57) ABSTRACT

A pawl assembly comprising a pawl held in a floating engagement with a support structure and being operable to engage a ratchet, the support structure having an abutment portion, wherein in a first phase, on initial contact with the ratchet, the pawl remains in the floating engagement and is operable to move into a second phase, in which the pawl is operable to contact the abutment portion, to rotate the pawl towards full engagement with the ratchet.

16 Claims, 8 Drawing Sheets

FOREIGN PATENT DOCUMENTS

| | | |
|---|---|---|
| EP | 1514749 | 3/2005 |
| GB | 1408462 | 10/1975 |
| GB | 1515773 | 6/1978 |
| GB | 2010071 | 11/1978 |
| GB | 2309785 A | 1/1997 |
| GB | 2349120 A | 4/2000 |
| GB | 2388430 A | 3/2003 |

OTHER PUBLICATIONS

EP Search Report concerning corresponding application EP 09167778; 6 pages; Oct. 11, 2010.

UK Patent Office; Combined Search and Examination Report concerning related GB App. 0606272.3; Jul. 3, 2006; 6 pages.

UK Patent Office; Search Report concerning related GB App. 0705663.3; Jul. 19, 2007; 1 page.

* cited by examiner

PAWL ASSEMBLY

FIELD OF THE INVENTION

The present invention relates to a pawl assembly comprising a pawl operable to engage a ratchet.

BACKGROUND OF THE INVENTION

A pawl and ratchet assembly is a well known mechanical device. The ratchet comprises either a wheel, or linear, rack having a plurality of spaced-apart teeth. The pawl is pivotably mounted about a fixed point, adjacent the ratchet, such that the pawl is operable to rotate to engage one of the teeth of the ratchet, to prevent movement of the ratchet in at least one direction.

A ratchet and pawl assembly has numerous applications. One particular application is in a reel assembly, which may form part of a seat belt arrangement. A webbing strap is stored wrapped around a spindle pivotably mounted in a reel housing from which the webbing strap may be paid out. The initial amount of webbing strap paid out to secure the strap around a seat occupant depends on, inter alia, the size and position of the seat occupant. To allow the occupant freedom of movement and to carry out tasks, more webbing strap may be paid out temporarily during use, if the occupant moves from the standard seating position, for example when leaning forward. A torsional spring between the spindle and housing urges the spindle to rotate to retract the webbing, so as to take up any slack webbing when the occupant returns to the standard seating position.

When the occupant is subjected to an acceleration/deceleration outside of an acceptable range—for example in a crash situation—payout of the webbing strap must be prevented, so as to retain the occupant in the seat and thereby reduce the risk of injury to the seat occupant. In a known reel, the spindle is associated with a ratchet wheel. A corresponding pawl is biased toward engagement with the ratchet and is associated with an acceleration sensor which, when triggered, releases and allows the pawl to engage with the teeth of the ratchet wheel, preventing further payout of the webbing strap and thereby retaining the occupant in the seat. It is important to stop the payout of the webbing strap as soon as possible once the acceleration sensor has been triggered.

In a crash situation, just before or as the pawl is triggered, the ratchet will begin to rotate (as a result of the inertia of the occupant in the seat causing the webbing strap to pay out). The pawl, being pivotably fixed relative to the housing, will rotate into a position where the tip of the pawl engages with a respective tooth of the ratchet wheel. The reactionary force of the pawl will prevent further rotation of the ratchet.

In order to effectively stop the ratchet, and prevent further payout of the webbing, there must be a sufficient amount of contact between the tip of the pawl and the tip of the teeth of the ratchet. Preferably, the tip of the pawl will be fully engaged with the entire leading face of a tooth of the ratchet at the point of contact. There is often a situation, however, where the pawl has not rotated towards the ratchet by a sufficient amount to allow full (or at least substantial) surface contact between the pawl and teeth by the time the pawl engages with the tooth.

In extreme situations of such marginal contact, the forces may be so great over the marginal contact area that the tip of either the pawl or the tooth of the ratchet shears off, or is at least deformed to some extent. Such damage would not only cause the ratchet to continue to rotate until the pawl engages with the next, undamaged, tooth but would also affect the reliability of the ratchet and pawl assembly in future operation. The assembly would need to be replaced.

Marginal contact between the pawl and tooth may cause the pawl to rebound from the ratchet altogether, allowing the ratchet to continue to rotate, and for webbing strap to pay out. The biasing of the pawl causes the pawl subsequently to re-approach the ratchet, for a second attempt at engagement. The contact between the pawl and tooth on the second attempt may be sufficient to avoid the pawl rebounding and/or the pawl/tooth being damaged. In extreme situations, this so-called "skip-lock" could continue for many iterations before there is a sufficient contact area between the pawl and tooth. This is undesirable.

To promote full engagement of a pawl with a ratchet tooth, the pawl may be pivotably mounted to a fixed point of the housing in such a way that, upon contact of the pawl tip with the teeth of a ratchet, the reactionary force imposed by the ratchet tooth on the pawl tip will act to create a torque (moment arm) about the pivot point of the pawl. Accordingly, in situations of marginal contact, the torque created in use may cause the pawl to fully engage with the entire surface of the tooth. However, whilst this known arrangement does conveniently promote full engagement of the pawl tip with the ratchet teeth, it still does not guarantee full engagement. The arrangement therefore does not reliably address the issues of tooth shear and skip-lock because it may still allow the pawl to take the full load of the reactionary force of the ratchet tooth before full engagement of the pawl and tooth has been established. The frictional forces caused by marginal pawl-tooth contact will be greater than the torque created by the offset pawl pivot point. Indeed it is known and has been proven in testing that the torque generated in this known arrangement is never able to provide sufficient driving force to overcome frictional forces due to extreme cases of marginal tooth-pawl contact and is therefore inherently and chronically susceptible to causing tooth shear damage in these situations.

SUMMARY OF THE INVENTION

Accordingly, the present invention provides a pawl assembly comprising a pawl held in a floating engagement with a support structure and being operable to engage a ratchet, the support structure having an abutment portion, wherein:

in a first phase, on initial contact with the ratchet, the pawl remains in the floating engagement and is operable to move into a second phase, in which the pawl is operable to contact the abutment portion, to rotate the pawl towards full engagement with the ratchet.

Preferably, the abutment portion is provided by a profiled surface associated with the support structure.

Conveniently, the pawl comprises a tip, to engage with the teeth of a ratchet; and a base, to engage with the abutment portion.

Advantageously, at least a part of the tip of the pawl is radiussed.

Preferably, the base of the pawl comprises a substantially cylindrical portion and a lug extending therefrom.

Conveniently, the abutment portion comprises a profiled surface having a cylindrical bearing portion of substantially the same radius as the cylindrical portion of the base of the pawl; and a step to contact the lug.

Advantageously, the pawl assembly is configured such that, during the transition from the first phase to the second phase, the lug contacts the step, causing a rotation of the pawl about the step, which in turn causes the cylindrical portion of the pawl to be seated in the cylindrical bearing portion of the support, urging the tip of the pawl into full engagement with the ratchet.

Preferably, in use, the tangent of the point of contact of the pawl with the ratchet lies between the ratchet and the centre point of the cylindrical portion.

Conveniently, the pawl assembly is configured such that movement of the pawl in the first phase is generally linear.

Advantageously, the movement is substantially parallel to the tangent of the point of contact of the pawl with the ratchet.

Preferably, the pawl is mounted to the support structure by a resilient connection.

Conveniently, the resilient connection is a torsional spring.

Advantageously, one end of the torsional spring is associated with the support structure and the other end is associated with the pawl.

Preferably, the pawl assembly further comprises a trigger mechanism.

Conveniently, the pawl assembly further comprises a ratchet.

The present invention further provides a pawl assembly according to the invention, having a trigger finger pivotably mounted to the pawl; a ratchet; and a trip plate wherein the pawl is biased into engagement with the ratchet and the trigger finger rests on the surface of the trip plate such that, upon activation of the trigger finger, the pawl is caused to engage with the teeth of the ratchet.

Preferably, the pawl is biased into engagement with the ratchet by a driving spring.

Conveniently, the pawl assembly further comprises a trigger mechanism, and a torsional spring associated between the trigger finger and pawl to substantially prevent activation of the trigger finger until the trigger mechanism is activated.

The present invention further provides a reel assembly comprising a housing and a pawl assembly according to the invention.

Preferably, the abutment portion is provided by the internal surface of the housing.

BRIEF DESCRIPTION OF THE DRAWINGS

The present invention will now be described, by way of example only, with reference to the accompanying figures in which.

DETAILED DESCRIPTION

Figure 1:
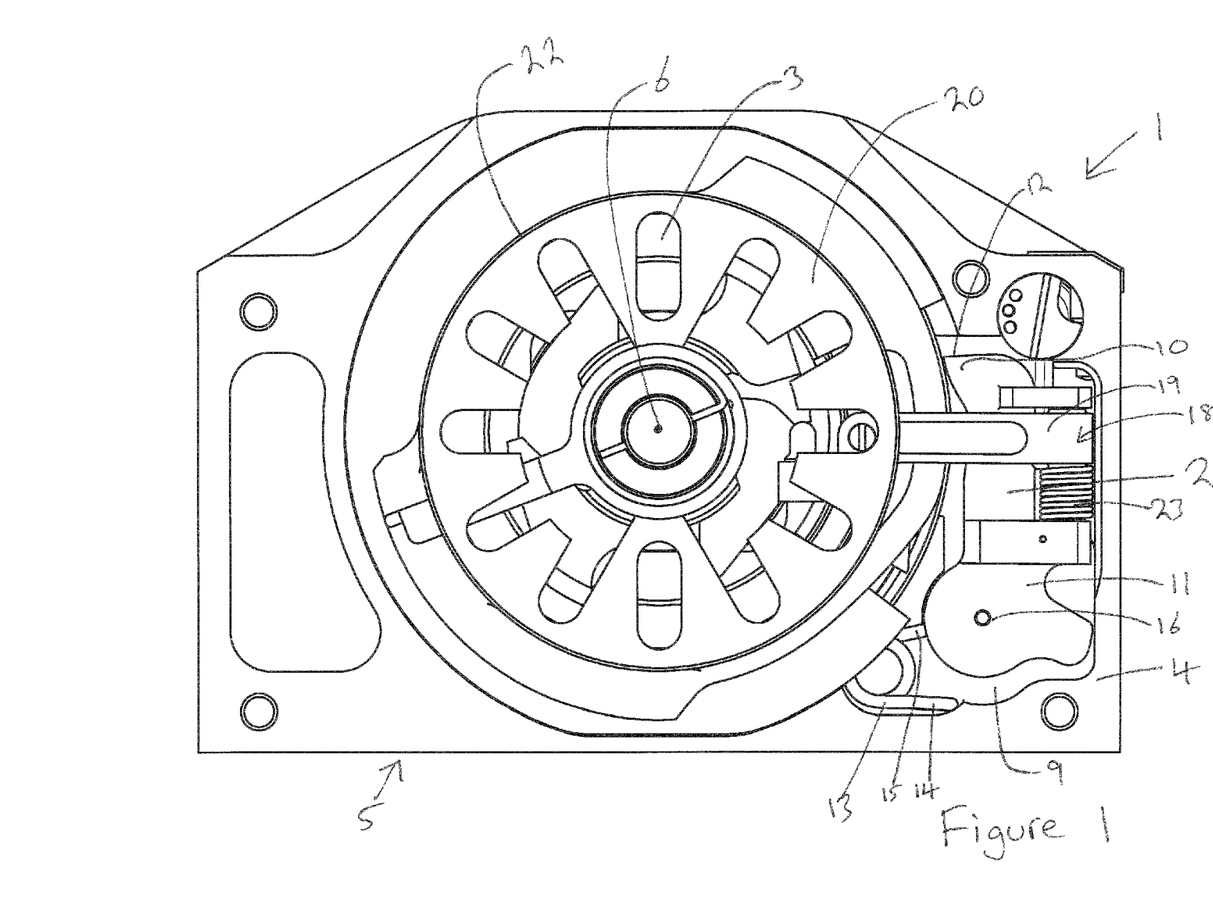
FIG. 1 illustrates a pawl assembly embodying the present invention, prior to activation.

FIG. 1 shows a pawl assembly 1 embodying the present invention comprising a pawl 2 and a ratchet wheel 3 (seen more clearly in FIGS. 2 to 6). Both the pawl 2 and ratchet 3 are mounted on a support structure 4, forming part of a housing 5. The ratchet wheel 3 is pivotably mounted about a centre point 6 and is provided with a plurality of circumferentially-spaced teeth 7, each having a leading face 8 in a plane substantially normal to the tangent of the ratchet wheel 3. The leading faces 8 may alternatively be angled with respect to the tangent. The support structure 4 comprises a recess 5 9, in which a pawl 2 is held in a floating engagement with respect to the support structure 4, described in more detail below.

The pawl 2 comprises a tip 10 and a base 11. The tip 10 of the pawl 2 is configured to engage with the leading face 8 of a tooth 7 of the ratchet wheel 3. Preferably, the pawl 2 and ratchet 3 are configured such that, upon full engagement, the surface 12 of the tip 10 of the pawl 2 is substantially parallel and/or flush with the leading face 8 of a respective tooth 7 of the ratchet wheel 3, so as to provide a contact area over which operational forces may be distributed.

In the embodiment shown, the pawl 2 is held in a floating engagement with the support structure 4 by a resilient connection comprising a torsional spring 13. Other springs or resilient connections could be used. The torsional spring 13 comprises a plurality of helical turns, with first 14 and second 15 mounting legs protruding from either end of the spring 13. A first leg 14 is associated with the support structure 4 and the second leg 15 is associated with the base 11 of the pawl 2. In the embodiment shown, the second leg 15 is pivotably received in a bore 16 in the base 11 of the pawl 2. The end of the second leg 15 may be crimped to prevent separation of the torsional spring 13 and the pawl 2. The first leg 14 may be pivotably or fixedly received in a bore or cavity of the support structure 4.

The pawl assembly 1 further comprises a pawl driving spring 17 with one leg 30 associated with the support structure 4. The other leg of the driving spring 17 contacts the pawl 2 to bias the pawl 2 toward engagement with the ratchet teeth 7. The bias of the pawl driving spring 17 causes the pawl 2 to move towards engagement with the ratchet 3.

Figure 8:
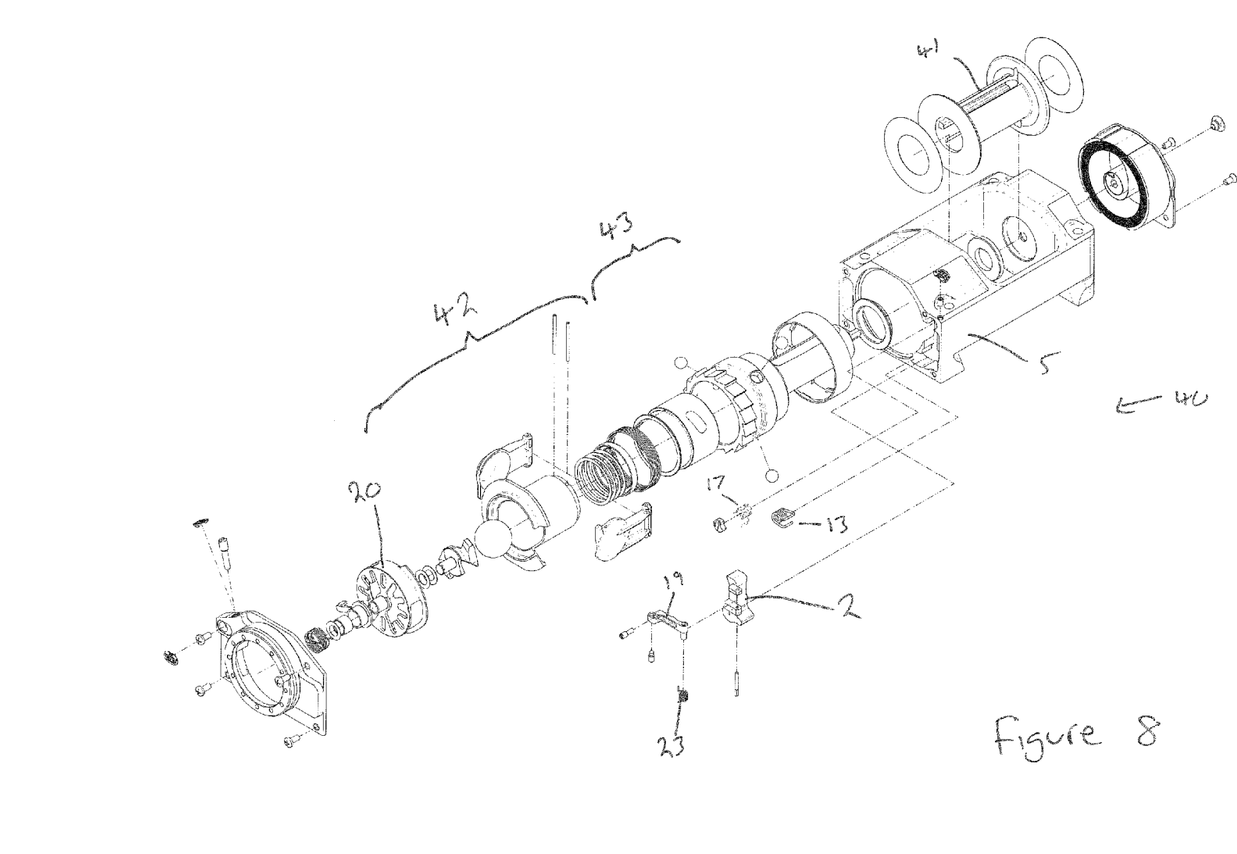
FIG. 8 illustrates an exploded view of a reel assembly embodying the present invention.

A trigger mechanism 18 is provided to prevent contact between the pawl 2 and ratchet 3 until the pawl assembly 1 is positively triggered, for example by an acceleration sensor 42 or dwell mechanism 43 (shown in FIG. 8).

Figure 2:
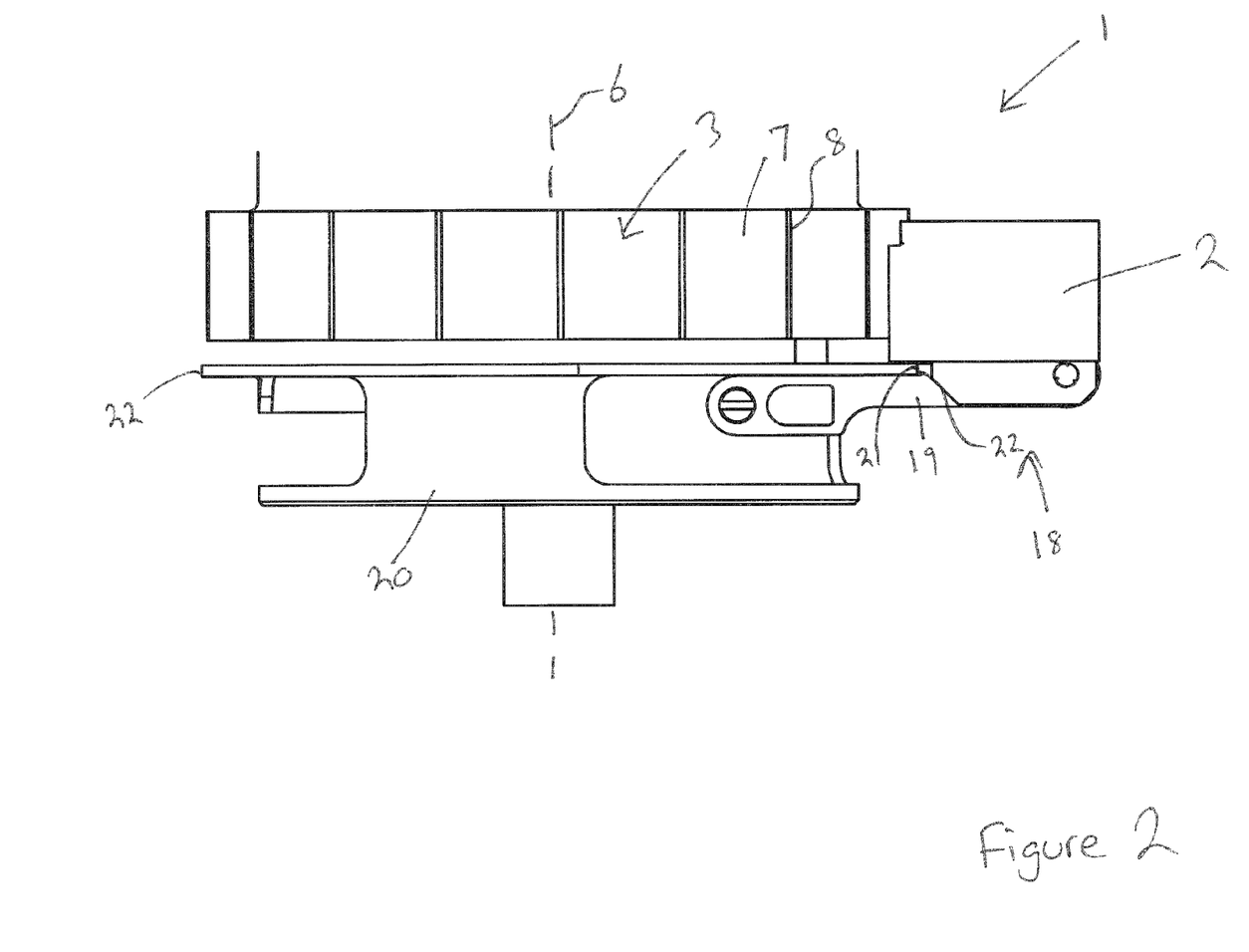
FIG. 2 is a top view of part of the pawl assembly of FIG. 1.
Figure 3:
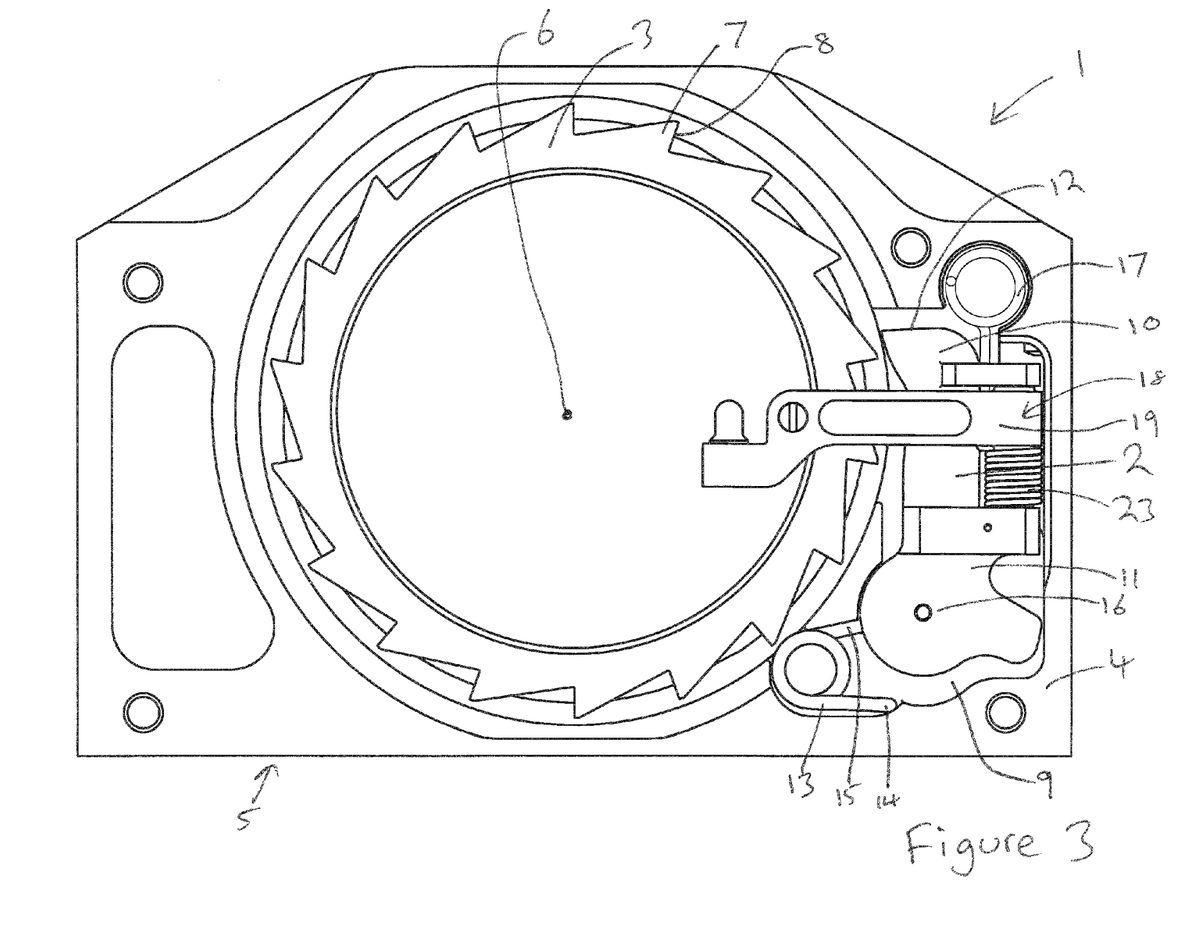
FIGS. 3 TO 6 illustrate the pawl assembly in various stages of activation.

As shown in FIGS. 1 and 2, the trigger mechanism 18 comprises a trigger finger 19 pivotably mounted to the pawl 2. A trip plate 20 (only shown in FIGS. 1 and 2 and removed in FIGS. 3 to 6 for clarity) is mounted co-axially with, but not connected to, the ratchet wheel 3. The trigger finger 19 is provided with a shoulder 21 which engages with an edge 22 of the trip plate 20, to prevent the pawl 2 from engaging with the ratchet 3. The trigger finger 19 is further provided with contact pads, which may be used to activate the trigger finger 19. In one embodiment, a contact pad may comprise a polymeric screw having a rounded head, the screw received in a respective threaded bore of the pawl 2. The position of the screw with respect to the bore, and thus the pawl 2, may be adjusted so as to calibrate the point at which the acceleration sensor causes the trigger finger 19 to actuate, and allow the pawl 2 to engage with the ratchet 3.

In the embodiment shown, the trigger finger 19 is provided with a torsional spring 23 between the trigger finger 19 and the pawl 2. This reduces the risk of inadvertent dislodgement of the trigger finger 19 from the trip plate 20, for example when the housing 5 is subject to a sudden force which is below that required to trip the acceleration sensor. Additionally, the spring 23 is used to cause the trigger finger 19 to re-engage with the edge 23 of the trip plate 20 when the pawl assembly 1 is re-set.

As described above, the pawl 2 is held in a floating engagement with respect to the support structure 4. In the embodiment shown, the floating engagement is afforded by the use of a torsional spring 13 between the pawl 2 and the support structure 4. The pawl 2 is substantially free to move in any direction in at least the plane parallel to the ratchet wheel 3 (i.e. perpendicular to the rotational axis 6 of the ratchet wheel 3). Accordingly, the pawl 2 as a whole may translate in any direction within the plane, and also rotate within the plane (about an axis perpendicular to the plane). Such a floating arrangement is not possible with prior art pawls, which pivot about a fixed point. The pawl 2 of the present invention is not fixed with respect to the support structure 4 but is able to float.

Figure 4:
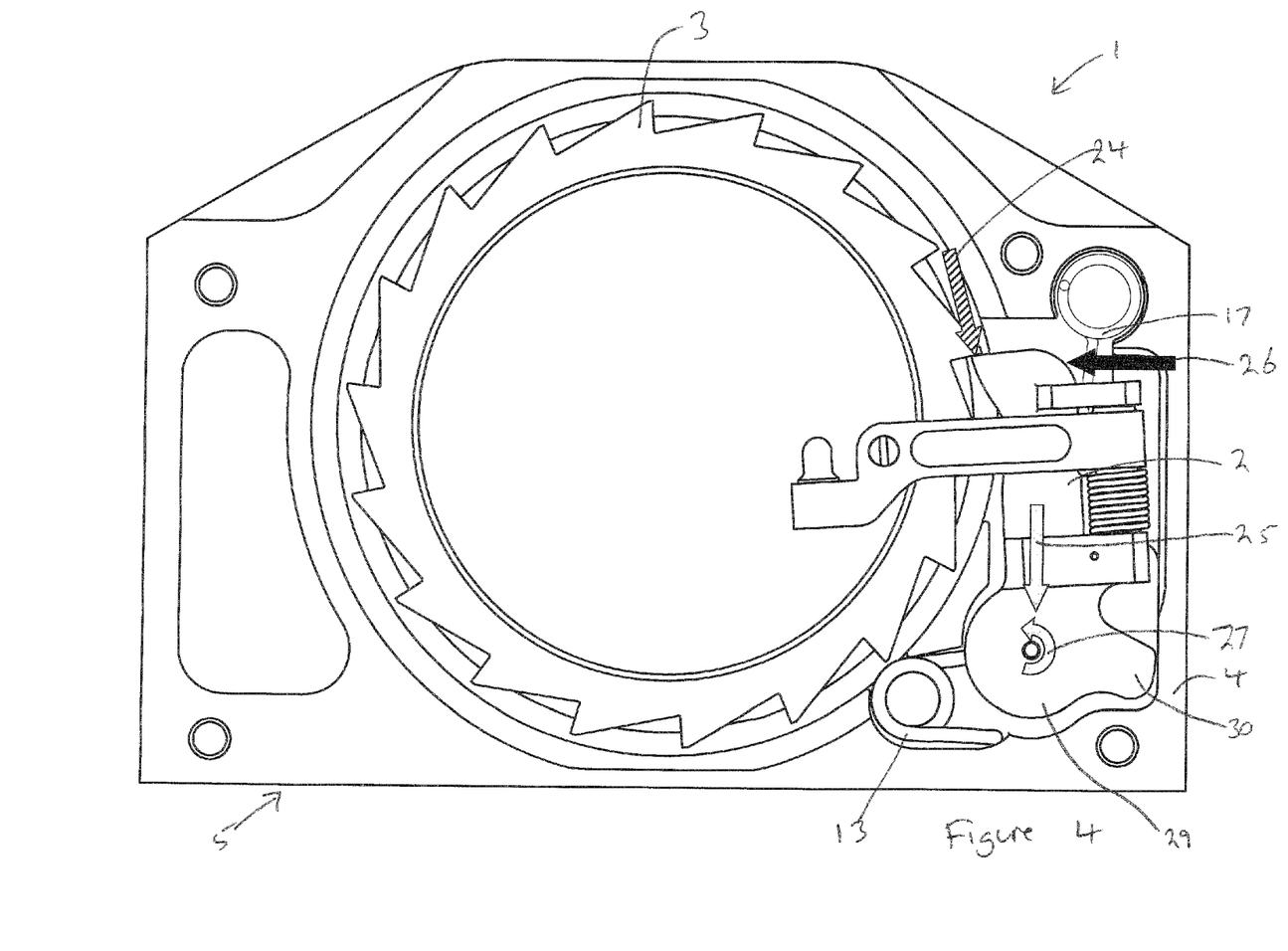

FIG. 4 shows the pawl assembly 1 immediately after having been triggered. At this point, the shoulder 21 has been dislodged from the edge 22 of the trip plate 20 and the biasing force (indicated by solid arrow 26) of the pawl driving spring 17 causes the pawl tip 10 to travel towards the ratchet wheel 3. Owing to the pivoting engagement of the torsion spring 13 in the bore 16 of the base 11 of the pawl 2, the pawl 2 tends to pivot (indicated by grey arrow 27) about the axis of the bore 16.

As the ratchet wheel 3 rotates, there will reach a point where one of the teeth 7 of the ratchet wheel 2 will contact the tip 10 of the pawl 2. The amount of contact between the tip 10 of the pawl 2 and the leading face 8 of the tooth 7 will depend on how far the pawl tip 10 has moved towards the centre of the ratchet 3 by the time the tooth 8 rotates into contact with the pawl tip 10.

Figure 5:
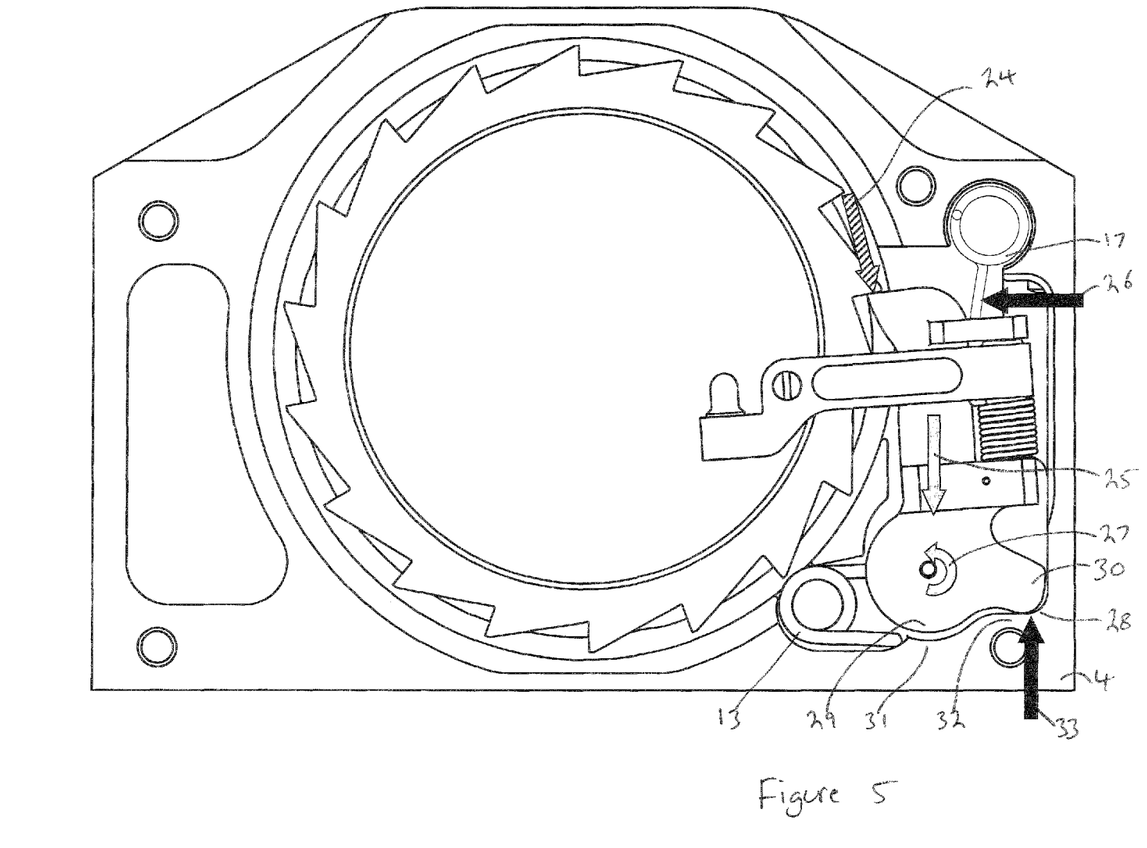

Upon contact, the tooth 7 will apply a force, indicated by arrow 24, to the pawl 2, as indicated in FIGS. 4 and 5. The force 24 will be applied in a direction generally parallel to the tangent of the ratchet 3 at the point of contact. As a result, the torsional spring 13 will be depressed, causing the pawl 2 to move with the rotation of the ratchet 3. Owing to this floating configuration of the pawl 2 and torsional spring 13, the force 24 imposed on the pawl 2 will cause the pawl 2 to move in a generally linear direction downwards (indicated by grey arrow 25). Arrow 24 is shown with hatching to denote that the pawl 2 is not subjected to the full reactionary force of the ratchet tooth 7, because some of that force is taken up by the torsion spring 13.

As the pawl 2 moves 25 generally downwards, the pawl driving spring 17 continues to impart a biasing force on the pawl 2, promoting full engagement of the pawl tip 10 with the teeth 7. Accordingly, if there was only marginal initial contact between the pawl tip 10 and the tooth 7, any frictional forces across the contact area will be at least partially counteracted by the resiliency of the torsional spring 13. In the prior art, any marginal contact may otherwise cause the tooth to shear or be damaged, or cause the pawl tip to skip from the tooth. The likelihood of tooth shear/damage and skip lock is reduced by providing the pawl 2 of the invention in a floating engagement with the support structure 4 because the floating arrangement allows additional time for the further engagement of the pawl 2 with the tooth 7 under the influence of the pawl driving spring 17.

As a convenient result, the force 26 imparted by the pawl driving spring 17 may be greater than the surface friction between the pawl tip 10 and tooth 7 in cases of marginal contact, causing the pawl tip 10 to further engage with the tooth 7, increasing the contact area. This is possible due to the floating engagement of the pawl 2 with respect to the support structure 4. Without the floating engagement of the present invention, the frictional forces in the case of marginal contact would be too great and would not allow full engagement of the pawl with the tooth.

The pawl assembly 1 is configured so as to allow a predetermined amount of movement of the pawl within the recess 9 in the housing 5. The greater the amount of floating movement allowed; the more likely the pawl 2 will be able to engage fully with the leading face 8 of a tooth 7. However, if the amount of floating movement allowed is too large, there will be an appreciable delay between the activation of the pawl 2 and the full locking of the ratchet 3. A pawl assembly 1 embodying the present invention is configured so as to reduce the likelihood of damage to either or both of the pawl tip 10 and ratchet teeth 7, whilst ensuring a reliable and fast acting ratchet and pawl system.

In some situations, the pawl tip 10 may still not be in full engagement with the leading face 8 of the tooth 7 by the time the pawl 2 has traveled to the limit of its floating movement (i.e. the end of a first phase). Embodiments of the present invention account for this by affording a secondary pivoting motion (a second phase) to urge the pawl 2 into full contact with the tooth 7 of the ratchet.

With reference to FIG. 5, the support structure 4 comprises an abutment portion 28. In the embodiment shown, the abutment portion 28 comprises a profiled (e.g. raised) inner surface of the recess 9 of the housing 5. As the pawl 2 moves with respect to the support structure 7, it is operable to contact the abutment portion 28, to rotate the pawl 2 towards full engagement with the ratchet 7, as will now be described.

The base of the pawl comprises a substantially cylindrical portion 29 having a lug 30 extending therefrom. The aforementioned bore 16—in which one leg 15 of the torsional spring 13 is received—is provided in the centre of the substantially cylindrical portion 29.

The abutment portion 28 of the support structure 4 comprises a profiled surface having a cylindrical bearing portion 31 of substantially the same radius as the cylindrical portion 29 of the base 11 of the pawl 2. The profiled surface further comprises a step 32, which is operable to contact the lug 30 of the pawl. The profiled surface is therefore substantially of the same shape as the profile of the cylindrical portion 29 and lug 30 of the pawl. However, the pawl assembly 1 is configured such that as the pawl 2 approaches the abutment portion, contact is first made between the lug 30 and the step 28, as shown in FIG. 5. As a result, the reactionary force 33 of the step 28 on the lug 30, coupled with the continued force 24 applied by the leading face 8 of the tooth 7 of the ratchet 3, and the force 26 of the pawl driving spring 17, cause the pawl 2 to rotate about its base, so as to promote full engagement of the pawl tip 10 with the leading face 8 of the tooth 7 (see FIG. 6).

Figure 6:
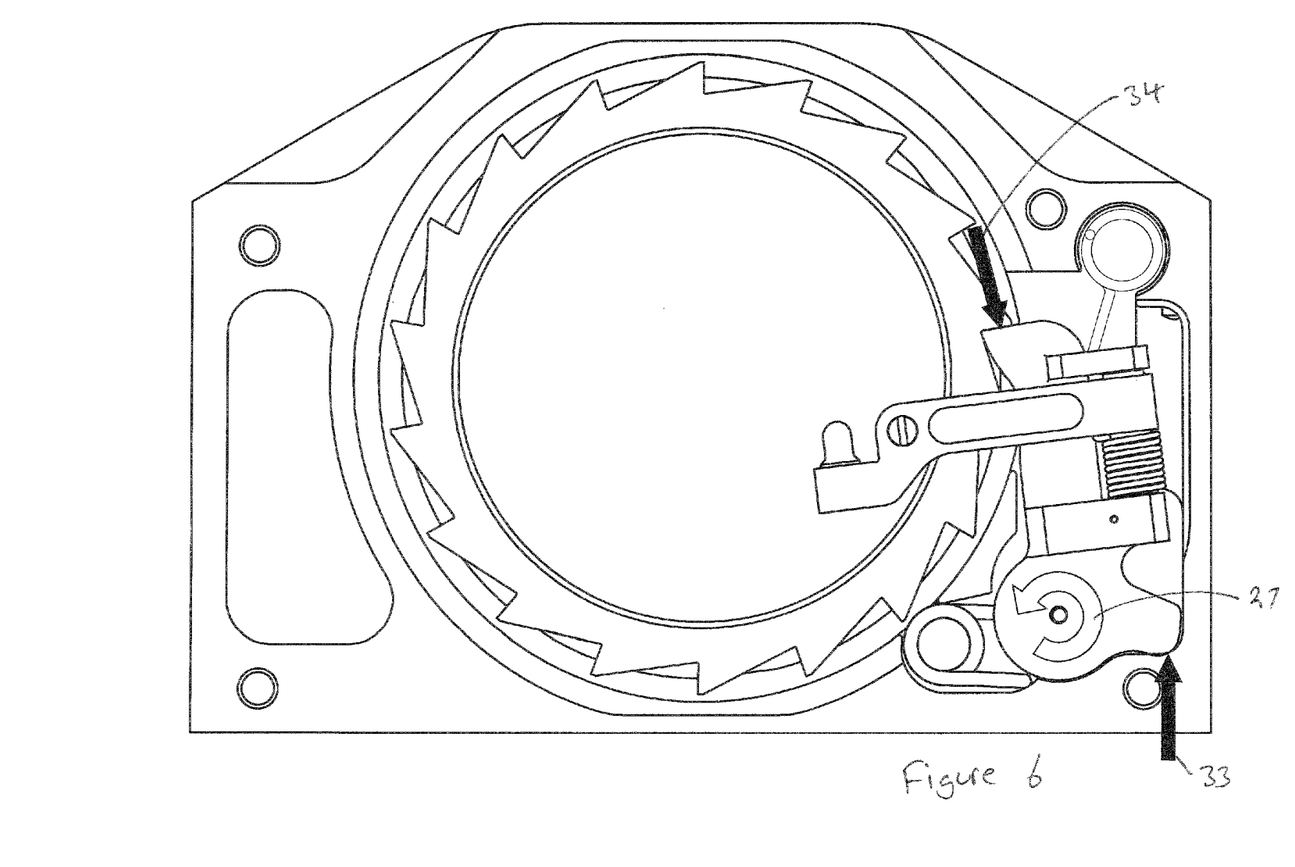

It will be appreciated from FIG. 6 that, in this second phase, no further "floating" movement of the pawl 2 with respect to the support structure is allowed. At this point, the pawl 2 will therefore take all the load imparted on it by the leading face 8 of the tooth 7 of the ratchet 3 (denoted by solid arrow 34). Conveniently, at this point, the outer surface of the base 11 of the pawl 2 is in contact with substantially all (or the entire) of the profiled surface of the support structure 4. In other words, the lug 30 is contacting the step 28 and the cylindrical portion 29 of the base 11 of the pawl 2 is contacting the cylindrical bearing portion 31 of the support structure 4.

One particular benefit of the invention is that the full load 34 of the reactionary force of the ratchet tooth 7 is only imparted on the pawl 2 after the tip 10 of the pawl 2 is in full engagement with the ratchet tooth 7, thereby preventing tooth shear or tooth damage. Compare the partial load 24 denoted in FIGS. 4 and 5, when there is marginal contact, with the full load 34 denoted in FIG. 6 when there is full engagement with the pawl trip 11 and leading force 8 of tooth 7. This geometric configuration of the pawl assembly 1, more specifically the support structure 4, is such that the full load will not be transmitted when there is only marginal contact. This geometric configuration of the pawl assembly 1, more specifically the support structure 4, is such that the full load will not be transmitted when there is only marginal contact. This geometric configuration of the pawl assembly 1, more specifically the support structure 4, is such that the full load will not be transmitted when there is only marginal contact.

It will also be appreciated from FIG. 6 that the tangent of the point of contact of the pawl tip 11 with the ratchet 3 lies between the ratchet 3 and centre point 16 of the cylindrical portion 29. Accordingly, the forces created by the leading face of the tooth will act about the pivot point 16, causing a moment arm which will, continue to urge the pawl 2 into engagement with the ratchet tooth 7.

When the pawl assembly 1 is reset (and when the webbing strap no longer exerts a load on the ratchet wheel), the floating engagement of the pawl with respect to the support structure, e.g. the resilient connection 17, causes the pawl 2 to return to its original, un-triggered, position.

In other embodiments of the present invention, the ratchet wheel may be a rack.

The abutment portion may comprise a peg or protrusion, so long as it causes the pawl to rotate when the pawl contacts the abutment portion.

Figure 7:
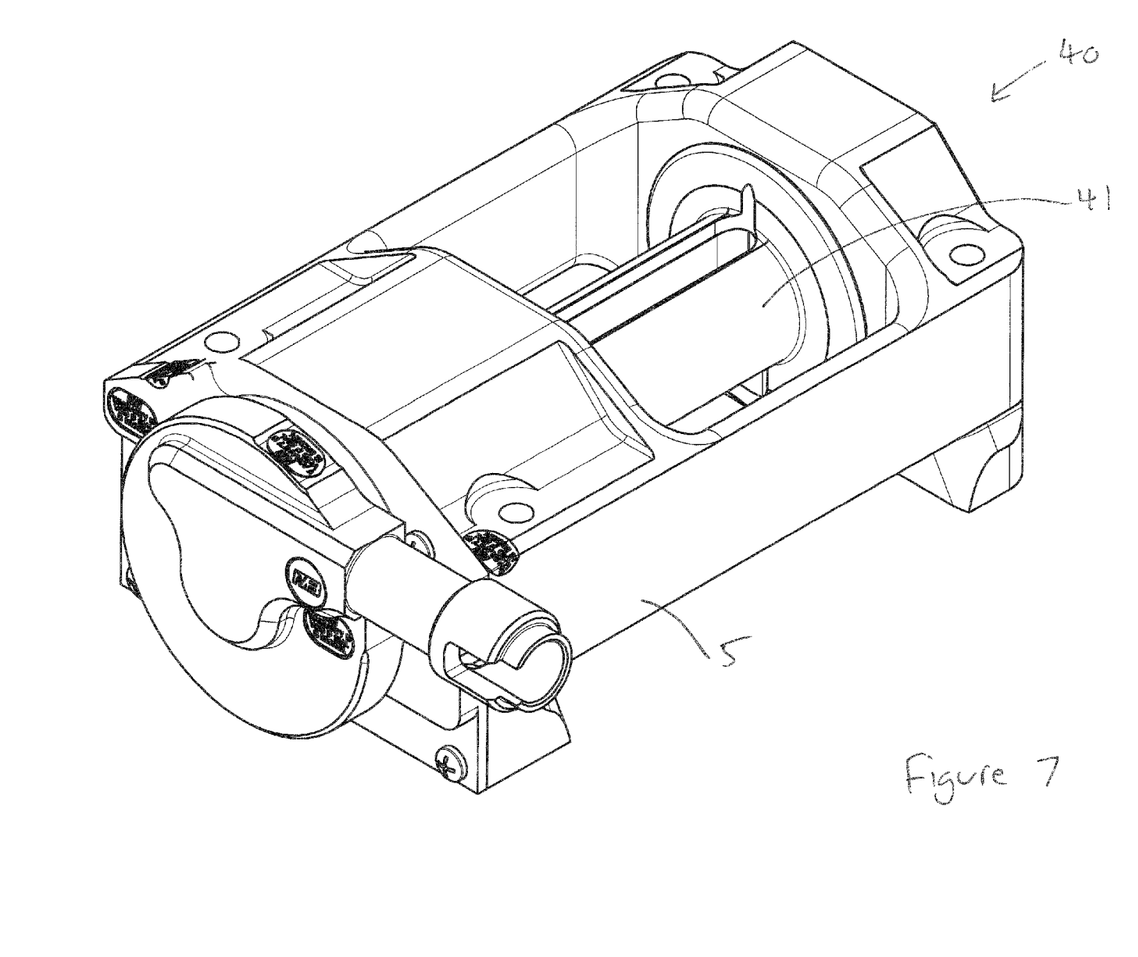
FIG. 7 illustrates a reel assembly embodying the present invention.

The pawl assembly may be utilised in a reel assembly 40, as shown in FIG. 7, having a housing 5 and a spool 41, around which a webbing strap (not shown) may be stored. FIG. 8 illustrates an exploded view of a reel assembly 40, including the pawl assembly 1. In addition, the reel assembly comprises an acceleration sensor 42 and a dwell mechanism 43.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A pawl assembly comprising
a pawl held in a floating engagement with a support structure, the support structure having an abutment portion, wherein the pawl comprises a tip, to engage with teeth of a ratchet; and a base, to engage with the abutment portion, wherein the base of the pawl comprises a substantially cylindrical portion and a lug extending therefrom, and the abutment portion comprises a profiled surface having a cylindrical bearing portion of substantially the same radius as the cylindrical portion of the base of the pawl; and a step to contact the lug, wherein:
in a first phase, on initial contact with the ratchet, the pawl remains in the floating engagement and is operable to move into
a second phase, in which the pawl is operable to contact the abutment portion, to rotate the pawl towards full engagement with the ratchet, configured such that, during the transition from the first phase to the second phase, the lug contacts the step, causing a rotation of the pawl about the step, which in turn causes the cylindrical portion of the pawl to be seated in the cylindrical bearing portion of the support structure, urging the tip of the pawl into full engagement with the ratchet.

2. The pawl assembly according to claim 1, wherein the profiled surface is associated with the support structure.

3. The pawl assembly according to claim 1, wherein, in use, the tangent of the point of contact of the pawl with the ratchet lies between the ratchet and a central axis of the cylindrical portion.

4. The pawl assembly according to claim 1, configured such that movement of the pawl in the first phase is generally linear.

5. The pawl assembly according to claim 4, wherein the movement is substantially parallel to the tangent of the point of contact of the pawl with the ratchet.

6. The pawl assembly according to claim 1, wherein the pawl is mounted to the support structure by a resilient connection.

7. A pawl assembly according to claim 6, wherein the resilient connection is a torsional spring.

8. The pawl assembly according to claim 7, wherein one end of the torsional spring is associated with the support structure and the other end is associated with the pawl.

9. The pawl assembly according to claim 1, further comprising a trigger mechanism.

10. The pawl assembly according to claim 9, further comprising the ratchet.

11. The pawl assembly according to claim 1, comprising a trigger finger pivotably mounted to the pawl; the ratchet; and a trip plate wherein the pawl is biased into engagement with the ratchet and the trigger finger rests on the surface of the trip plate such that, upon activation of the trigger finger, the pawl is caused to engage with the teeth of the ratchet.

12. The pawl assembly according to claim 11, wherein the pawl is biased into engagement with the ratchet by a driving spring.

13. The pawl assembly according to claim 12, further comprising a trigger mechanism, and a torsional spring associated between the trigger finger and pawl to substantially prevent activation of the trigger finger until the trigger mechanism is activated.

14. A reel assembly comprising a housing and the pawl assembly according to claim 1.

15. The reel assembly according to claim 14, wherein the abutment portion is provided by the internal surface of the housing.

16. The pawl assembly of claim 1 wherein the pawl is held in floating engagement for both translational and rotational motion relative to the support structure.

* * * * *